United States Patent Office 2,739,056
Patented Mar. 20, 1956

2,739,056

PROCESS OF EXTRACTING IRON FROM ORES

Karl Heimberg, Mulheim an der Ruhr, Germany, assignor to Compagnie Generale des Conduites d'Eau, Les Vennes-Liege, Belgium No Drawing. Application May 31, 1952,
Serial No. 291,059

9 Claims. (Cl. 75—46)

The present invention relates to a process of extracting iron from ores and more particularly from acidic ores.

The obtaining of iron from the acidic ores which are relatively poor in iron content has been very difficult economically because of the necessity for utilizing scrap metals of which there has been a distinct shortage in many countries of the world and also because of the necessity of utilizing ores which are very rich in iron content.

The shortage of scrap metals and of rich iron containing ores has imposed the necessity of seeking economical methods for the obtaining of iron from acidic iron ores. This has been attempted in the blast furnace. However, the methods utilized in the blast furnace have been unsatisfactory from an economic standpoint because of the extreme difficulties in producing a metal of high value in the ordinary blast furnace. The removal of sulfur from the iron contained in these acidic ores has been one of the major difficulties to be overcome.

One of the methods for producing crude pig iron from acidic ores is known as the Pasche-Peetz method. This method employs calcium oxide in the charge in order to lower the sulfur content of the pig iron which is produced. However, it was found that if the calcium oxides were used in such amounts that the slag produced was basic due to the excess of calcium oxide as compared to the acidic constituents of the slag such as silicon dioxide, the slag produced was very difficult to melt although the iron was de-sulfurized to a considerable extent. It was therefore necessary to use a considerable amount of coke in order to keep the basic slag molten and thereby allow for a removal of the sulfur from the iron. This process is therefore not economically feasible.

If a small amount of calcium oxide is used so that the slag remains acidic, the acidic slag melts easily, but the removal of sulfur from the iron is only very slight. Therefore, although less coke is utilized in order to melt the slag, the iron which is produced is of poor quality and therefore not usable for most purposes. De-sulfurization of this iron by known methods is extremely expensive and therefore acidic ores could not until the present time be utilized economically for the production of iron.

It is therefore an object of the present invention to provide a process for economically producing iron from acidic ores.

It is another object of the present invention to provide a process for extracting iron from acidic ores so as to produce relatively pure iron having a low sulfur content.

It is still another object of the present invention to provide a process for utilizing a cupola furnace in combination with a blast furnace to produce low sulfur-containing iron from acidic ores.

It is a further object of the present invention to provide a process for simultaneously de-sulfurizing iron and alloying the iron with other metals such as manganese and silicon.

With the above objects in view the present invention mainly comprises the steps of treating an acidic ore in a blast furnace so as to form an easily melting acidic slag having a low sulfur content, and pig iron having a high sulfur content; separating said slag from said pig iron; melting said pig iron having said high sulfur content in a reducing atmosphere in a cupola furnace so as to prevent formation of iron oxides; and passing said molten iron through a molten basic slag in said cupola furnace so as to de-sulfurize said iron, thereby obtaining iron having a low sulfur content.

The acidic ore in the blast furnace may have a small amount of calcium oxide added thereto so that some of the sulfur is removed from the pig iron. However, the amount of calcium oxide added to the acidic ore in the blast furnace should always be small enough so that the slag in the blast furnace will be acidic and therefore easily melting. It is well known that a basic slag is very difficult to melt and requires a great quantity of heat for melting the same in comparison with the amount of heat necessary to melt an acidic slag.

The reducing atmosphere is obtained in the cupola furnace by charging the same with the pig iron and with an excess carbon. The carbon is preferably in the form of coke which is easily obtainable and which is rich in carbon content. By excess of carbon it is meant that the carbon is present in the cupola furnace in excess of the normal requirements of such furnace. The term "excess" is further meant to define the fact that the cupola furnace always contains more carbon than will be completely oxidized to carbon dioxide by the amount of air which is introduced into the cupola furnace, thereby resulting in a reducing atmosphere in the cupola.

Preferably the fluid containing oxygen, such as air, which is introduced into the cupola furnace is preheated, the preferred temperature of preheating being 400–600° C. and the most preferred temperature being 500–600° C.

The use of preheated air which is preferably introduced into the cupola by means of tuyeres and at relatively rapid speeds allows for the creation of a very high temperature in the cupola furnace, the atmosphere in the cupola always being reducing due to the excess of carbon in the charge. The high temperature in the cupola furnace is necessary in order to melt the basic slag through which the pig iron is to pass and in which the pig iron is de-sulfurized. As previously mentioned the basic slag is difficult to melt and the process of the present invention by providing for the introduction of heated air into the cupola and the raising of the temperature to a very high degree, i. e. 1400° C. or higher, allows for the melting of the basic slag.

Although the coke charge in the cupola furnace is in excess so as to produce a reducing atmosphere, it should be noted that economically this process is extremely advantageous in that actually a smaller amount of coke is utilized percentage-wise in the production of the final product consisting of de-sulfurized iron, than any other process.

The reducing atmosphere is necessary in the cupola furnace in order to prevent the production of iron oxides and silicon dioxide. In an oxidizing atmosphere the silicon in the charge would be oxidized to silicon dioxide which would make the slag acidic. The de-sulfurization of iron does not take place in an acidic slag.

Furthermore, the reducing atmosphere prevents the formation of iron oxide which would prevent the de-sulfurization of the iron in the slag. Where there is no iron oxide present in the slag calcium sulfide will be formed therein, thereby removing the sulfur from the iron.

Iron sulfide will be reduced by calcium in the slag according to the following equation:

(1) $$FeS + Ca \rightarrow Fe + CaS$$

The presence of iron oxide in the slag will cause the iron oxide to react with any calcium in the slag according to the following equation:

(2) $$FeO + Ca \rightarrow CaO + Fe$$

thereby preventing the reduction of the iron sulfide by the calcium because the calcium will more easily react with the iron oxide than with the iron sulfide.

Also iron sulfide in the slag will be reduced by calcium oxide in the slag according to the following equation:

(3) $$FeS + CaO \rightarrow FeO + CaS$$

It may therefore be seen that the presence of iron oxide in the slag because of oxidation of the iron in the furnace would cause the equilibrium of Equation 3 to shift to the left thereby preventing de-sulfurization of the iron. This clearly shows that it is critical to prevent the formation of iron oxide so as to allow for de-sulfurization of the iron sulfide.

The iron oxide produced according to Equation 3 is reduced in the slag by the excess of carbon in the charge according to the following equation:

(4) $$FeO + C \rightarrow Fe + CO$$

Equation 4 shows that an excess of carbon and the reducing atmosphere produced thereby is necessary in order to reduce the iron oxide produced by Reaction 3. In a reducing atmosphere and at high temperature the molten metal passes through the slag saturated with carbon and therefore the carbon is present to reduce the iron oxide according to Equation 4, thereby assuring the displacement of the equilibrium in Equation 3 to the left and in Equation 4 to the right.

The cupola furnace according to the present invention is provided with a refractory lining. Preferably, the refractory lining is either neutral or basic so that any contamination of the slag by the refractory lining will not change the basic characteristic of the slag.

The cupola furnace is also provided according to the present invention with means, such as cold water, for cooling the walls of the cupola furnace so as to prevent melting of the refractory lining on the walls and thereby prevent contamination of the slag by the melted refractory lining. This cooling of the walls also prevents the necessity for periodically relining the walls of the furnace. In the event that the refractory lining is neutral or basic, the contamination of the slag by the melted refractory lining is not as great a difficulty in the process of de-sulfurizing the iron as is the case with an acid refractory lining. Therefore, the cooling of the walls of the cupola furnace is particularly advantageous where the cupola is lined with an acid refractory lining so as to prevent melting of the acid lining and contamination of the slag therewith.

It is another embodiment of the present invention to provide the slag bath with predetermined alloying metals such as manganese and silicon. The passing of the melted iron through the basic slag bath containing these alloying metals causes de-sulfurization of the iron and simultaneous alloying with the added metals.

The pig iron produced in the blast furnace which is subjected to further treatment in a cupola furnace according to the present invention will usually have a high sulfur content of from 0.2–3.5%. The iron content of this pig iron varies between 90–95%. The phosphorous content varies between 0.5–1.95%, the carbon content between 2.5–4%, the manganese content between 0.15–0.6% and the silicon content between 0.5–3.5%. Along with the de-sulfurization of the iron, the iron may be simultaneously alloyed with manganese and silicon or other alloying metals according to the present invention by the addition of such metals to the basic slag as previously explained. It is to be understood that the process of the present invention is not meant to be limited to pig iron produced in a blast furnace having the relative proportions above designated.

As examples of pig iron produced in the blast furnace which is subjected to further treatment in a cupola furnace, the original ore in a blast furnace having a small amount of calcium oxide added thereto, are the following:

| C  | 2.96  | 3.26  | 3.26  | 3.04  | 2.95  |
|----|-------|-------|-------|-------|-------|
| Si | 0.75  | 1.55  | 1.69  | 2.10  | 2.93  |
| Mn | 0.20  | 0.32  | 0.27  | 0.30  | 0.28  |
| P  | 1.79  | 1.92  | 1.81  | 1.68  | 1.68  |
| S  | 0.37  | 0.72  | 0.95  | 1.28  | 1.16  |
| Fe | 93.93 | 92.17 | 92.02 | 91.60 | 91.00 |

The corresponding slag produced with the pig irons above contain the following substances in the following proportions:

| $SiO_2$ | 41.77 | 36.7 | 39.3 | 43.9 | 44.3 |
|---------|-------|------|------|------|------|
| $Al_2O_3$ | 13.46 | 24.1 | 25.3 | 27.0 | 31.6 |
| CaO | 36.48 | 26.1 | 21.5 | 13.3 | 9.7 |
| MgO | 3.29 | 6.3 | 6.3 | 5.8 | 5.5 |
| S | 0.55 | 0.6 | 0.5 | 0.3 | 0.3 |
| FeO | 1.98 | 4.0 | 4.0 | 6.8 | 5.3 |

The slag number $p$ which is the ratio between the basic constituents of the slag and the acid constituents of the slag, for each of the above samples is as follows:

| $p$ | 0.87 | 0.71 | 0.55 | 0.30 | 0.22 |
|-----|------|------|------|------|------|

It is therefore clear that the more acid in the slag, the greater the sulfur content in the pig iron produced in the blast furnace.

A slag number of $p$ greater than 1 will indicate a basic slag which will result in a greater reduction in the sulfur content of the pig iron but which will cause an uneconomical process of the great expenditure of coke in keeping the basic slag melted. However, as previously explained, the process of the present invention overcomes all of these difficulties.

It is necessary according to the present invention to maintain a basic slag in the cupola furnace through which the molten pig iron passes and wherein the de-sulfurization of the pig iron takes place. It may be necessary to add calcium oxide to the slag in order to make certain that $p$ is greater than 1 and that the slag is therefore basic. The basic slag as previously explained is necessary in order to obtain substantially complete de-sulfurization of the iron.

The amount of calcium oxide added to the charge of ore in the blast furnace to partially de-sulfurize the pig iron, which addition of calcium oxide is always in such small amounts that the slag produced is acidic, may be in the following proportions, though the scope of the present invention is not limited to these proportions:

For iron ore of the following composition:

| total Fe | Mn | P | S | $SiO_2$ | $Al_2O_3$ | CaO | MgO | $CO_2$ | $H_2O$ |
|----------|------|------|------|---------|-----------|------|------|--------|--------|
| 32.93 | 0.46 | 0.41 | 0.05 | 32.56 | 9.32 | 6.00 | 2.03 | 1.30 | 3.60 | are required per 1000 kgs. ore the following additions of calcium oxyd in kgs. in form of $CaCO_3$

|                        | 570  | 435  | 300  | 90   | 0    |
|------------------------|------|------|------|------|------|
| in order to obtain $p=$ | 0.87 | 0.71 | 0.55 | 0.30 | 0.22 |

The process of the present invention of treating pig iron from a blast furnace in a cupola furnace according to the described process is highly advantageous not only in obtaining iron of the desired quality but also in obtaining it at a high temperature of about 1500° C. whereby it can be directly subjected to further treatment such as direct casting or to treatment in an electric furnace if desired.

The cupola furnace of the present invention can also serve as a gas producer and a portion of the gas produced in the cupola furnace can be used to preheat the air which is introduced into the cupola furnace through the tuyeres.

According to the process of the present invention the concentration of carbon in the final product can without difficulty be raised to 3.5–4% and more. The concentration of silicon does not change substantially from that of the pig iron introduced into the cupola furnace because of the high temperature and basicity of the slag in the cupola furnace. If desired however, the silicon content of the iron can be raised by augmenting the charge in the cupola furnace with an iron-silicon alloy. The above reference to silicon also holds true for manganese, there being no loss of manganese in the cupola furnace because of the conditions therein, and the manganese concentration can be raised by the addition of manganese to the charge in the cupola furnace. The concentration of phosphorous does not change to any important degree. If it is desired to raise the phosphorous concentration it is possible to add phosphates or other substances containing phosphorous to the charge in the cupola furnace.

Mainly, the present invention provides for a considerable lowering of the concentration of sulfur in the final product for the reasons previously stated. It is therefore possible by the process of the present invention to greatly improve the properties of a metal produced in a blast furnace. The metal from the blast furnace, having poor properties and a high sulfur content can be charged in the cupola entirely in a granulated form which allows for the use of coke having a small size, which coke is much cheaper than ordinary coke.

It is also possible according to the present invention to charge the pig iron from the blast furnace into the cupola in a molten fluid state. The pig iron charge may be mixed with scrap metals and with other old metals having a high iron content if desired. The basic process of the present invention remains the same.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of producing directly castable pig iron from acidic ores, comprising the steps of treating in a blast furnace an acidic ore so as to form an easily melting acidic slag having a low sulfur content, and pig iron having a high sulfur content of 0.2–3.5%, a phosphorus content of 0.5–1.95% and an iron content of 90–95%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to de-sulfurize said iron without lowering the phosphorous content thereof, thereby obtaining a molten directly castable pig iron having a low sulfur content.

2. A process of producing directly castable pig iron from acidic ores, comprising the steps of treating in a blast furnace an acidic ore so as to form an easily melting acidic slag having a low sulfur content, and pig iron having a high sulfur content of 0.2–3.5%, a phosphorus content of 0.5–1.95%, a carbon content of 2.5–4% and an iron content of 90–95%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to de-sulfurize said iron without lowering the phosphorous content thereof and to raise the carbon content to 3.5–4%, thereby obtaining a molten directly castable pig iron having a low sulfur content.

3. A process of producing directly castable pig iron from acidic ores, comprising the steps of treating in a blast furnace an acidic ore so as to form an easily melting acidic slag having a low sulfur content, and pig iron having a high sulfur content of 0.2–3.5%, a phosphorus content of 0.5–1.95%, a carbon content of 2.5–4%, a manganese content of 0.15–0.6% and an iron content of 90–95%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to de-sulfurize said iron without lowering the phosphorous and manganese contents thereof and to raise the carbon content to 3.5–4%, thereby obtaining a molten directly castable pig iron having a low sulfur content.

4. A process of producing directly castable pig iron from acidic ores, comprising the steps of treating in a blast furnace an acidic ore so as to form an easily melting acidic slag having a low sulfur content, and pig iron having a high sulfur content of 0.2–3.5%, a phosphorus content of 0.5–1.95%, a carbon content of 2.5–4%, a manganese content of 0.15–0.6%, a silicon content of 0.5–3.5% and an iron content of 90–95%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to de-sulfurize said iron without lowering the phosphorous, manganese and silicon contents thereof and to raise the carbon content to 3.5–4%, thereby obtaining a molten directly castable pig iron having a low sulfur content.

5. A process of producing directly castable pig iron from acidic ores, comprising the steps of treating in a blast furnace an acidic ore so as to form an easily melting acidic slag having a low sulfur content, and pig iron having a high sulfur content of 0.2–3.5%, a phosphorous content of 0.5–1.95%, a carbon content of 2.5–4%, a manganese content of 0.15–0.6%, a silicon content of 0.5–3.5% and an iron content of 90–95% separating said slag from said pig iron; melting said pig iron having said high sulfur content in a reducing atmosphere in a cupola furnace so as to prevent formation of iron oxides; and passing said molten iron through a molten basic slag at a temperature above 1400° C. and containing predetermined alloying metals in said cupola furnace so as to de-sulfurize said iron without lowering the phosphorous, manganese and silicon contents thereof and to raise the carbon content to 3.5–4% and to alloy said iron with said predetermined alloying metals, thereby obtaining a directly castable molten iron alloy having a low sulfur content.

6. A process of producing directly castable pig iron from acidic ores, comprising the steps of treating in a blast furnace an acidic ore so as to form an easily melting acidic slag having a low sulfur content, and pig iron having a high sulfur content of 0.37–1.28%, a phosphorous content of 1.68–1.92%, a carbon content of 2.95–3.26%, a manganese content of 0.20–0.32%, a silicon content of 0.75–2.93% and an iron content of 91–93.9%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to desulfurize said iron without lowering the phosphorous, manganese and silicon contents thereof and to raise the carbon content to 3.5–4%, thereby obtaining a molten directly castable pig iron having a low sulfur content.

7. A process of producing directly castable pig iron from acidic ores, comprising the steps of treating in a blast furnace an acidic ore so as to form an easily melting acidic slag having a low sulfur content, and pig iron having a high sulfur content of 0.37–1.28%, a phosphorous content of 1.68–1.92%, a carbon content of 2.95–3.26% a manganese content of 0.20–32%, a silicon content of 0.75–2.93% and an iron content of 91–93.9%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. and containing predetermined alloying metals in said cupola furnace so as to desulfurize said iron without lowering the phosphorous, manganese and silicon contents thereof and to raise the carbon content to 3.5–4% and to alloy said iron with said predetermined alloying metals, thereby obtaining a directly castable molten iron alloy having a low sulfur content.

8. A process of producing directly castable pig iron from acidic ores, comprising the steps of treating in a blast furnace an acidic ore having calcium oxide added thereto to partially desulfurize said ore but in an amount such that the slag in the blast furnace will be acidic and therefore easily melting so as to form an easily melting acidic slag having a low sulfur content, and pig iron having a high sulfur content of 0.37–1.28%, a phosphorous content of 1.68–1.92%, a carbon content of 2.95–3.26%, a manganese content of 0.20–0.32%, a silicon content of 0.75–2.93% and an iron content of 91–93.9%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to desulfurize said iron without lowering the phosphorous, manganese and silicon contents thereof and to raise the carbon content to 3.5–4%, thereby obtaining a molten directly castable pig iron having a low sulfur content.

9. A process of producing directly castable pig iron from acidic ores, comprising the steps of treating in a blast furnace an acidic ore so as to form an easily melting acidic slag having a low sulfur content and having a ratio of the basic constituents of the slag to the acid constituents of the slag equal to at least 0.2, and pig iron having a high sulfur content of 0.37–1.28%, a phosphorous content of 1.68–1.92%, a carbon content of 2.95–3.26%, a manganese content of 0.20–0.32%, a silicon content of 0.75–2.93%, and an iron content of 91–93.9%; separating said slag from said pig iron; melting said pig iron having said high sulfur content in a reducing atmosphere in a cupola furnace so as to prevent formation of iron oxides; and passing said molten iron through a molten basic slag at a temperature above 1400° C. in said cupola furnace so as to desulfurize said iron without lowering the phosphorous, manganese and silicon contents thereof and to raise the carbon content to 3.5–4%, thereby obtaining a molten directly castable pig iron having a low sulfur content.

References Cited in the file of this patent

UNITED STATES PATENTS

| | | |
|---|---|---|
| 1,357,780 | Koppers | Nov. 2, 1920 |
| 1,872,057 | Boegehold | Aug. 16, 1932 |
| 2,100,086 | Paschke et al. | Nov. 23, 1937 |
| 2,133,571 | Rochling et al. | Oct. 18, 1938 |
| 2,149,480 | Paschke et al. | Mar. 17, 1939 |
| 2,493,642 | Renshaw et al. | Jan. 3, 1950 |

OTHER REFERENCES

"Handbook of Cupola Operation," published 1949 by the American Foundrymen's Assoc.